US010961750B2

(12) United States Patent
Kondo et al.

(10) Patent No.: US 10,961,750 B2
(45) Date of Patent: Mar. 30, 2021

(54) COVER UNIT

(71) Applicant: Sumitomo Riko Company Limited, Aichi (JP)

(72) Inventors: Hiroyuki Kondo, Novi, MI (US); Kenneth Carrier, Novi, MI (US); Koichiro Iwanaga, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 678 days.

(21) Appl. No.: 15/720,429

(22) Filed: Sep. 29, 2017

(65) Prior Publication Data
US 2019/0100947 A1  Apr. 4, 2019

(51) Int. Cl.
*E05C 19/06* (2006.01)
*E05B 83/24* (2014.01)
*E05B 77/36* (2014.01)
*E05B 85/02* (2014.01)
*B60R 25/04* (2013.01)
*E05C 19/00* (2006.01)

(52) U.S. Cl.
CPC ............ *E05B 83/243* (2013.01); *B60R 25/04* (2013.01); *E05B 77/36* (2013.01); *E05B 85/02* (2013.01); *E05C 19/06* (2013.01); *Y10S 292/38* (2013.01); *Y10T 292/03* (2015.04); *Y10T 292/0894* (2015.04); *Y10T 292/438* (2015.04)

(58) Field of Classification Search
CPC . Y10T 292/42; Y10T 292/438; Y10T 292/03; Y10T 292/0894; Y10T 292/0902; Y10T 292/0907; Y10S 292/38; Y10S 292/73; E05C 19/06; E05B 83/243
See application file for complete search history.

(56) References Cited

U.S. PATENT DOCUMENTS

| 307,253 | A | * | 10/1884 | Armstrong | .............. E05B 15/10 292/2 |
| 1,062,733 | A | * | 5/1913 | Rahotina | ................. E05C 19/06 292/87 |
| 2,836,452 | A | * | 5/1958 | Kubik | ................... E05B 55/005 292/169.18 |

(Continued)

FOREIGN PATENT DOCUMENTS

| DE | 3619584 A1 * | 12/1987 | ............. E05C 19/06 |
| DE | 4323520 A1 * | 3/1994 | ............. E05B 37/02 |

(Continued)

*Primary Examiner* — Carlos Lugo
(74) *Attorney, Agent, or Firm* — Greenblum & Bernstein, P.L.C.

(57) ABSTRACT

A cover unit includes a first divisional cover, and a second divisional cover. The first divisional cover and second divisional cover include a first locking portion and second locking portion, respectively. The first locking portion and second locking portion are made of an elastomer. The first locking portion and second locking portion lock to one another to couple the first divisional cover to the second divisional cover, or vice versa. The first locking portion includes a prong-shaped main tab. The second locking portion includes a main bore into which the main tab is insertable. The main tab includes a main claw disposed on the leading-end side, and locked to the main bore to inhibit the main tab from coming off from the main bore.

13 Claims, 9 Drawing Sheets

(56) References Cited

U.S. PATENT DOCUMENTS

| | | | | |
|---|---|---|---|---|
| 2,895,199 | A | * | 7/1959 | Jones .................. A44B 17/0029 24/618 |
| 3,977,595 | A | * | 8/1976 | Hillgenberg ......... B65D 43/162 220/4.23 |
| 5,076,626 | A | * | 12/1991 | Tiddy ...................... E05B 15/02 292/1 |
| 5,270,011 | A | * | 12/1993 | Altherr ............... B01L 3/50825 215/216 |
| 5,297,405 | A | * | 3/1994 | Manning ................. E05B 9/084 292/DIG. 38 |
| 5,316,355 | A | * | 5/1994 | Hartwell ............... E05B 1/0007 292/347 |
| 5,577,779 | A | * | 11/1996 | Dangel ................... E05C 19/06 220/326 |
| 6,578,446 | B2 | * | 6/2003 | Staser ...................... E05B 79/12 292/1 |
| 7,044,328 | B1 | * | 5/2006 | Ciavarella ................ A47K 5/12 220/326 |
| 7,810,598 | B2 | | 10/2010 | Nonogaki |
| 8,020,901 | B2 | * | 9/2011 | Watanabe ................ B41J 29/00 292/80 |
| 8,045,337 | B2 | * | 10/2011 | Morales .................. E05C 19/06 361/801 |
| 8,726,473 | B2 | * | 5/2014 | Dole .................... B60R 13/0206 24/297 |
| 9,422,748 | B2 | * | 8/2016 | Liu ....................... E05B 63/006 |
| 2008/0110432 | A1 | | 5/2008 | Nonogaki |
| 2013/0285430 | A1 | * | 10/2013 | Ohba .................. B60N 2/2352 297/367 P |

FOREIGN PATENT DOCUMENTS

| | | | | |
|---|---|---|---|---|
| DE | 102008005575 A1 | * | 8/2009 | ............ E05B 85/02 |
| GB | 2272725 | * | 5/1994 | |
| JP | 4905308 | | 1/2012 | |
| JP | 2014-095314 | | 5/2014 | |

* cited by examiner

COVER UNIT

BACKGROUND OF THE INVENTION

1. Field of the Invention

The present disclosure relates to a cover unit for covering an object.

2. Description of the Related Art

As a cover for covering an object, it has been known that various types of covers are available, such as covers for forming decorative faces, and covers for demonstrating a function of absorbing impacts or the like. Moreover, depending on the configuration and size of an object, it has been done sometimes to adopt constructions coupling a plurality of divisional covers to each other.

JP4905308B2 or JP2014-95314A, for instance, discloses an engine cover using multiple divisional covers. In the engine cover, a recess, which a first divisional cover has, engages with an engagement tab, which a second divisional cover has, so that the first divisional cover and second divisional cover are coupled to one another. In general, since a material with high hardness is used mainly for the engine cover, the recess and engagement tab, which engage with one another, produce a sufficient engagement force for the engine cover.

SUMMARY OF THE INVENTION

However, when coupler portions are formed of a hard resin, for instance, the coupler portions might possibly make the workability unfavorable upon coupling the first divisional cover and second divisional cover to one another. In particular, the more complicated configuration an object has, the more the coupling workability worsens. It is therefore an object of the present disclosure to provide a cover unit making the coupling workability favorable.

For example, a cover unit according to the present disclosure comprises: a first divisional cover covering some of an object partially; and a second divisional cover not only covering another some of the object partially, but also coupled to the first cover. The first divisional cover includes: a first cover body; and a first locking portion made of an elastomer, and formed integrally with the first cover body. The second divisional cover includes: a second cover body; and a second locking port ion made of an elastomer, formed integrally with the second cover body, and locking to the first locking portion to couple the first divisional cover to the second divisional cover. The first locking portion has a prong-shaped main tab. The second locking portion has a main bore into which the main tab is insertable. The main tab is provided with a main claw disposed on a leading-end side thereof, and locked to the main bore to inhibit the main tab from coming off from the main bore.

When the main tab of the first locking portion in the first divisional cover is inserted into the main bore of the second locking portion in the second divisional cover, the main claw, which is disposed on the leading-end side of the main tab, locks to the main bore. As a result, the main tab is inhibited from coming off from the main bore. Note herein that at least the first locking portion of the first divisional cover and the second locking portion of the second divisional cover are made of an elastomer. Therefore, the first locking portion and second locking portion exhibit flexibility. As a consequence, the flexible first locking portion and second locking portion make the workability favorable upon coupling the first divisional cover and second divisional cover to one another.

It is preferable that one of the first locking portion and second locking portion can further have a sub-claw, and that the other one of the first locking portion and the second locking portion can further have a sub-recess not only locked to the sub-claw under such a condition that the main tab is inserted into the main bore, but also locked to the sub-claw to maintain the main claw under a condition of being locked to the main bore.

Since the first locking portion and second locking portion are made of an elastomer, they produce a low coupling force at the coupled section, compared with when they are made of a hard resin. However, in addition to the above-described locking between the main claw and the main bore, the locking between the sub-claw and the sub-recess makes it possible to secure a coupling force sufficiently between the first locking portion and the second locking portion.

BRIEF DESCRIPTION OF THE DRAWINGS

A more complete appreciation of the present disclosure and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

(1) Overall Construction of Cover Unit 2

A cover unit 2 covers an outer face of an object 1. The object 1 can be made up of various physical bodies. For example, the object 1 can be made up of a prime mover such as a motor or engine serving as a component part for vehicular application, or a component part for vehicular interior. The object 1 can also be made up of component parts other than component parts for vehicular application. In embodiments according to the present disclosure, a motor is given as an example for the object 1. A motor serving as the object 1 has neither a simple cylindrical shape nor prismatic shape, but has a complicated configuration.

Figure 1:
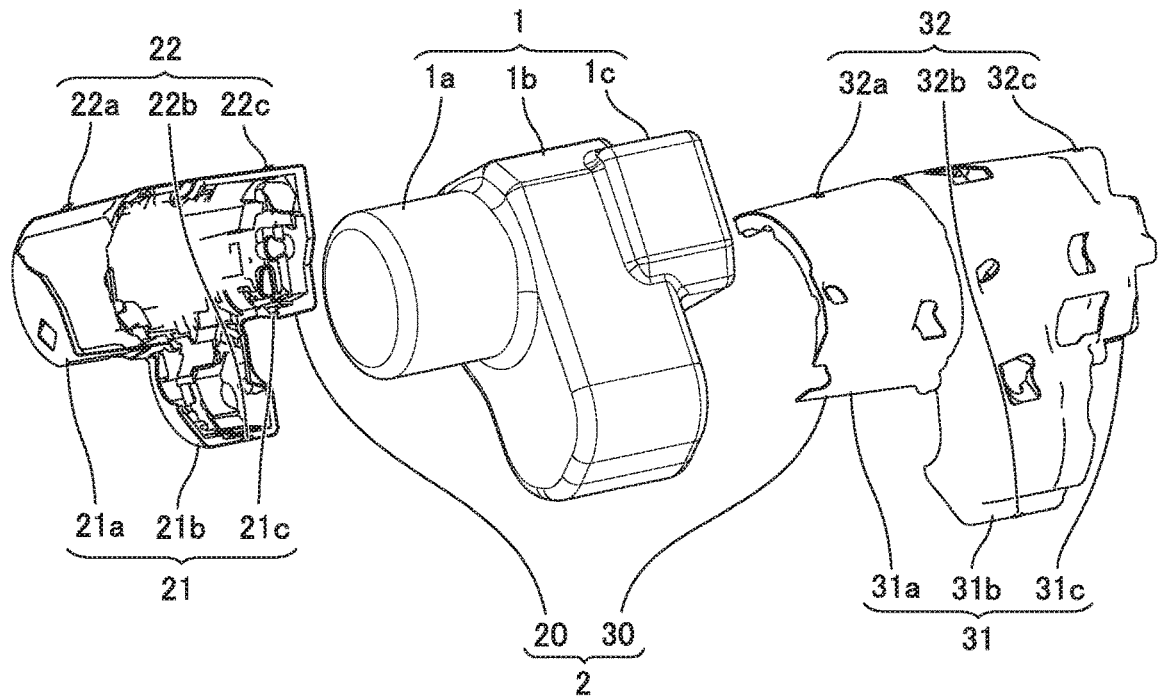
FIG. 1 is an exploded perspective diagram illustrating an object, and a first divisional cover and second divisional cover which construct a cover unit.

As illustrated in FIG. 1, the object 1 comprises a cylindrical columned portion $1_a$, a long-length portion $1_b$ being greater than the columned portion $1_a$, and a rectangular parallelepiped portion $1_c$ having a size to the same extent as that of the columned portion $1_a$. On one of the axial end faces, the columned portion $1_a$ is connected with the long-length portion $1_b$. On one of the opposite end faces disposed on the side that is opposite to the columned portion $1_a$, the long-length portion $1_b$ is connected with the rectangular parallelepiped portion $1_c$. Thus, the object 1 has irregular faces.

The cover unit 2 covers the object 1 on the outer faces. The cover unit 2 is used for the following objectives: isolating sounds, which the object 1 generates, and then inhibiting the sounds from being transmitted to the outside; restraining the object 1 from vibrating; protecting the object 1 from attacks coming from the outside; and lowering the object 1 in terms of the aggression to the outside. For example, the cover unit 2 is aimed at sound isolation against motor noises. Therefore, the cover unit 2 makes configurations conforming to the outer faces of the object 1. That is, the cover unit 2 has complicated configurations in the same manner as the object 1.

In order to make the cover unit 2 fulfill the abovementioned objectives of a cover, an elastomer exhibiting flexibility is suitable for the cover unit 2. In particular, a thermoplastic elastomer is used preferably for the cover unit 2. Moreover, the cover unit 2 made of an elastomer can cover the object 1 with complicated configurations so as to follow or go along the outer faces.

In addition, the cover unit 2 comprises a first divisional cover 20, and a second divisional cover 30, as shown in FIG. 1. Since the object 1 has complicated configurations on the outer faces as described above, it is not easy to form a cover serving as one and only member. Hence, using the first divisional cover 20, which covers some of the object 1, and the second divisional cover 30, which covers another some of the object 1, makes it possible to cover the object 1, which is formed as complicated configurations, with ease. Note that the cover unit 2 can allowably comprise three or more divisional covers as well.

Note herein that the first divisional cover 20 and second divisional cover 30 are not fixated to the object 1. However, the first divisional cover 20 and second divisional cover 30 are coupled to one another. Since the first divisional cover 20 and second divisional cover 30 are thus coupled with one another, it is possible for the cover unit 2 to cover the object 1 readily and securely without providing the object 1 with any installation sites.

Hence, the first divisional cover 20 comprises a first cover body 21, and a first locking portion 22. The first cover body 21 covers some of the object 1. The first locking portion 22 is formed integrally with the first cover body 21. An elastomer of the same kind forms the first cover body 21 and first locking portion 22 integrally. That is, the first cover body 21 as well as the first locking portion 22 are made of an identical elastomer. In detail, the first divisional cover 20 further comprises a site $21_a$, a site $21_b$, and a site $21_c$, as shown in FIG. 1. The site $21_a$ covers the columned portion $1_a$ in the object 1 by half approximately; the site $21_b$ covers the long-length portion $1_b$ by half approximately; and the site $21_c$ covers the rectangular parallelepiped portion $1_c$ by half approximately. Moreover, the respective sites ($21_a$, $21_b$, $21_c$) are integrated with each other.

The first locking portion 22 comprises a site $22_a$, a site $22_b$, and a site $22_c$. The site $22_a$ is located at an edge in the site $21_a$ of the first cover body 21; the site $22_b$ is located at an edge in the site $22_b$ of the first cover body 21; and the site $22_c$ is located at an edge in the site $21_c$ of the first cover body 21. Note that the first divisional cover 20 can comprise the first locking portion 22 in an arbitrarily determined quantity.

Moreover, the second divisional cover 30 comprises a second cover body 31, and a second locking portion 32. The second cover body 31 covers another some of the object 1. The second locking portion 32 is formed integrally with the second cover body 31. An elastomer of the same kind forms the second cover body 31 and second locking portion 32 integrally. That is, the second cover body 31 as well as the second locking portion 32 are made of an identical elastomer. In detail, the second divisional cover 30 further comprises a site $31_a$, a site $31_b$, and a site $31_c$, as shown in FIG. 1. The site $31_a$ covers the columned portion $1_a$ in the object 1 by half approximately; the site $31_b$ covers the long-length portion $1_b$ by half approximately; and the site $31_c$ covers the rectangular parallelepiped portion $1_c$ by half approximately. Moreover, the respective sites ($31_a$, $31_b$, $31_c$) are integrated with each other.

The second locking portion 32 locks to the first locking portion 22 to couple the first divisional cover 20 and second divisional cover 40 with one another. The second locking portion 32 comprises a site $32_a$, a site $32_b$, and a site $32_c$. The site $32_a$ is located at an edge in the site $31_a$ of the second cover body 31; the site $32_b$ is located at an edge in the site $31_b$ of the second cover body 31; and the site $32_c$ is located at an edge in the site $31_c$ of the second cover body 31. Note that the second divisional cover 30 can comprise the second locking portion 32 in an arbitrarily determined quantity.

Note herein that the first locking portion 22 and second locking portion 32 are made of an elastomer. Therefore, the workability in coupling the first locking portion 22 to the second locking portion 32, or vice versa, is very favorable, compared with a case where they are made of a hard resin. However, since the first locking port ion 22 and second locking portion 32 exhibit flexibility, such a fear might possibly arise that a coupling force lowers between the first locking portion 22 and the second locking portion 32. Hence, a material for the first divisional cover 20 and second divisional cover 30 is selected in order to enable the first locking portion 22 and first locking portion 32 to maintain the locked state.

As for a material selectable for the first locking portion 22 and second locking portion 32 (or the first divisional cover 20 and second divisional cover 30), an olefin-based thermoplastic elastomer is suitable. However, it is also possible to use a styrene-based thermoplastic elastomer, or the like. Moreover, a material whose shore type "A" hardness (durometer type "A" hardness) (ISO 7619:2010) is from A60 to A95 can be used suitably. Thus, it is possible not only to achieve the objectives, such as the sound isolation by the first cover body 21 and second cover body 31, but also to secure a coupling force sufficiently between the first locking portion 22 and the second locking portion 32.

(2) First Embodiment

Next, the first locking portion 22 and second locking portion 32 will be hereinafter described with reference to FIGS. 2 through 17. Note herein that the right/left direction in FIGS. 2, 8 and 14 coincides with a direction of butting the first cover body 21 and second cover body 31 against one another at the butted sections. Moreover, the object 1 exists on the downside in FIGS. 2, 8 and 14. That is, the upside corresponds to an outer side of the object 1 in FIGS. 2, 8 and 14, whereas the downside corresponds to a central side of the object 1.

(2-1) First Locking Portion

Figure 2:
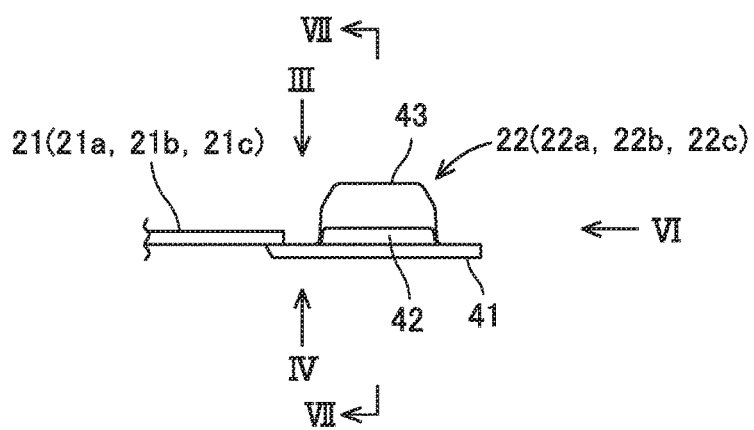
FIG. 2 is a front view of a first locking portion of a first divisional cover in a cover unit according to First Embodiment.
Figure 3:
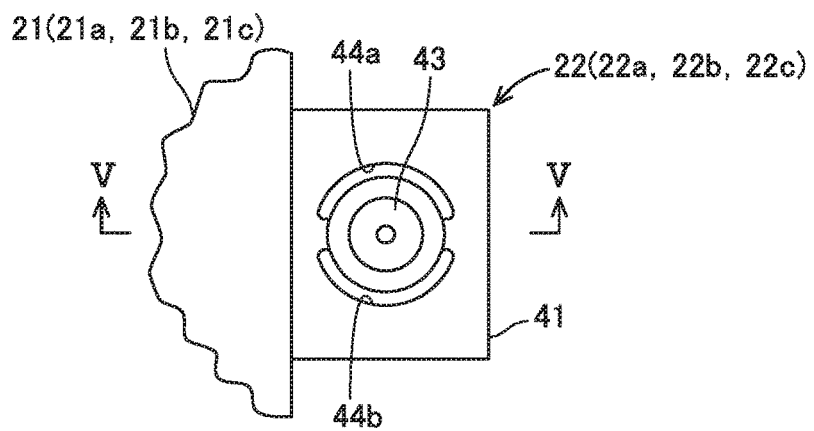
FIG. 3 is a diagram viewed in the direction of arrow III shown in FIG. 2, namely, a plan view of the first locking portion.
Figure 4:
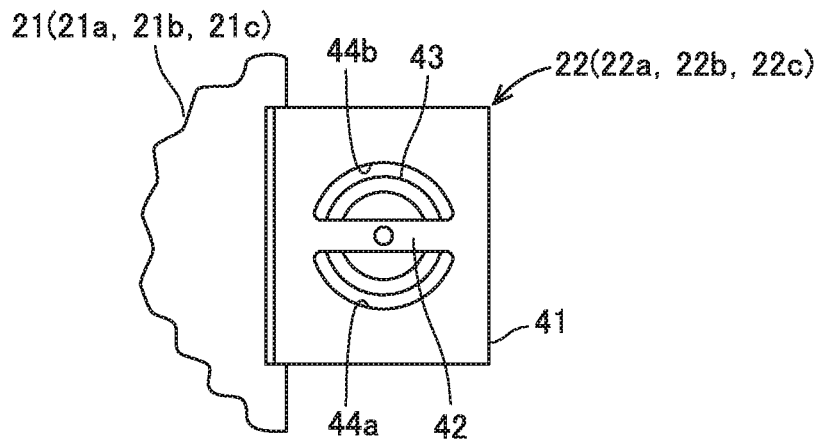
FIG. 4 is a diagram viewed in the direction of arrow IV shown in FIG. 2, namely, a bottom view of the first locking portion.
Figure 5:
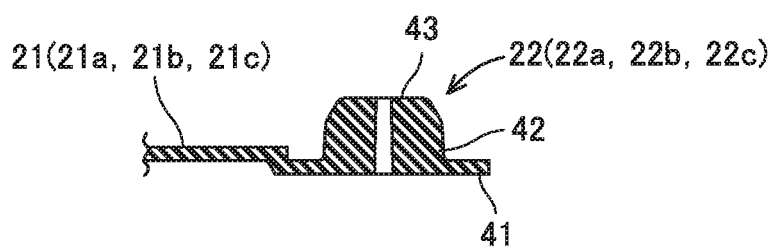
FIG. 5 is a cross-sectional view taken in the direction of arrows V-V shown in FIG. 3.

The first locking portion 22 (or one of the sites ($22_a$, $22_b$, $22_c$)) will be hereinafter described with reference to FIGS. 2 through 7. As illustrated in FIG. 2, the first locking portion 22 comprises a base tab 41 to be connected with an edge of the first cover body 21, namely, with one of the sites ($21_a$, $21_b$, $22_c$) at the edge. The base tab 41 is formed as a plate shape, as shown in FIGS. 3 and 4. Moreover, the base tab 41 has a contour formed as a rectangle, as shown in the drawings. In addition, the end tab 41 is formed so as to extend from an edge of the first cover body 21 on the rear-face side, as shown in FIGS. 2 and 5. That is, the base tab 41 is not located on an identical plane with an edged part in the first cover body 21, but is disposed so as to give a step or bump to an edged end-face site of the first cover body 21. In detail, the base tab 41 is located to deviate or shift to a side of the object 1 relative to the edged part of the first cover body 21.

Figure 6:
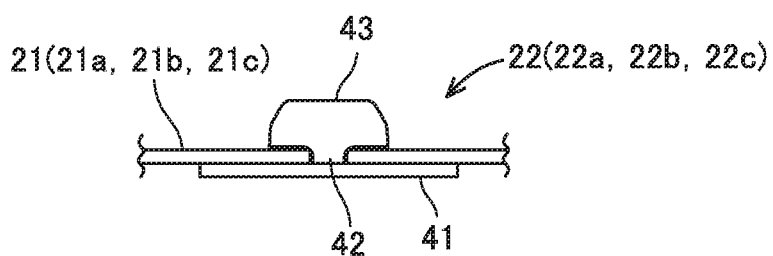
FIG. 6 is a diagram viewed in the direction of arrow VI shown in FIG. 2, namely, a right side view of the first locking portion.
Figure 7:
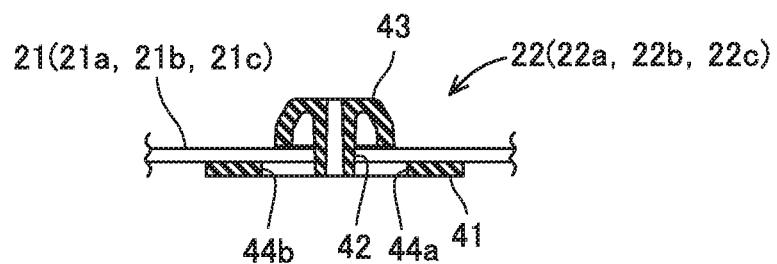
FIG. 7 is a cross-sectional view taken in the direction of arrows VII-VII shown in FIG. 2.

Moreover, the first locking portion 22 further comprises a prong-shaped main tab (42, 43) to be connected with the base tab 41. As illustrated in FIGS. 2, 6 and 7, the main tab (42, 43) is made up of a main-tab body 42, and a main claw 43. That is, the main-tab body 42 constitutes some of the claimed main tab, and the main claw 43 constitutes another some of the claimed main tab. In addition, the main-tab body 42 and main claw 43 are formed as a mushroomed configuration, as shown in FIGS. 6 and 7. Specifically, the main-tab body 42 is formed as a configuration corresponding to a stipe part of the mushroomed configuration, whereas the main claw 43 is formed as another configuration corresponding to a pileus part of the mushroomed configuration. Note that the main-tab body 42 and main claw 43 cannot necessarily be formed as a mushroomed configuration limitedly, but can also be formed as a hooked configuration, or the like, for instance.

At the root site, the main-tab body 42 is connected with the base tab 41 at around the middle, as shown in FIGS. 4 and 6. The main-tab body 42 is disposed so that the leading-end side extends from the base tab 41 to the upper side in FIG. 2, namely, in a direction separating away from the object 1. That is, the main-tab body 42 extends from the base tab 41 in a direction perpendicular to a direction of butting the first cover body 21 and second cover body 31 against one another. The main-tab body 42 is formed as a plate shape having a heavy thickness compared with that of the base tab 41. The plate-shaped main-tab body 42 is disposed so as to make the planar direction coincide with the butting direction, as shown in FIGS. 2, 4 and 6. Moreover, on the opposite sides in the planar direction, the plate-shaped main-tab body 42 is connected with the base tab 41, as shown in FIG. 4.

Note herein that sub-recesses (44a, 44b) are formed between the base tab 41 and the root site of the main-tab body 42, as shown in FIGS. 4 and 7. In First Embodiment, the sub-recesses (44a, 44b) penetrate through the base tab 41 in the normal direction to the faces of the base tab 41. In other words, the sub-recesses (44a, 44b) penetrate through the base tab 41 in a direction perpendicular to the direction of butting the first cover body 21 and second cover body 31 against one another.

As illustrated in FIG. 4, the sub-recesses (44a, 44b) are formed on both the upper and lower sides in the drawing while interposing the main-tab body 42 between them. That is, as illustrated in FIGS. 4 and 5, the main-tab body 42 is connected with the base tab 41 on the opposite sides in the butting direction. However, as illustrated in FIGS. 4 and 7, the main-tab body 42 is separated away from the base tab 41 in a direction perpendicular to the butting direction. Moreover, each of the sub-recesses (44a, 44b) is formed as a half-mooned configuration, as shown in FIGS. 3 and 4. In other words, the sub-recesses (44a, 44b) are formed in a substantially circular shape as a whole.

The main claw 43, which is disposed at the leading end of the main-tab body 42, is formed so as to spread from the main-tab body 42 to the surrounding as the pileus of a mushroomed configuration spreads out, as shown in FIG. 6. In particular, the main claw 43 has a circular shape, as shown in FIG. 3, when viewed against a direction in which the main-tab body 42 extends. Moreover, the main claw 43 has an outer peripheral face formed as a tapered shape so as to make the main claw 43 thinner toward the leading-end side of the main-tab body 42, as shown in FIGS. 6 and 7. In addition, the main claw 43 produces at the outer end a clearance between itself and the main-tab body 42, as shown in FIG. 7. In detail, the tapered inner peripheral surface of the main claw 43, and some of the outer peripheral surface of the main-tab body 42 are opposed to one another. That is, the main claw 43 comes to be capable of deforming elastically. When the main claw 43 deforms, it turns into a substantially elliptical configuration to have a smaller width in the right/left direction in FIG. 7.

Moreover, as illustrated in FIG. 4, the main claw 43 has an outer peripheral configuration that is viewable through the sub-recesses (44a, 44b) when it is viewed from the rear face of the base tab 41. That is, the outer peripheral configuration of the main claw 43 is formed to have a smaller diameter than the diameter of the sub-recesses (44a, 44b) that are formed in a circular shape as a whole. Accordingly, the main claw 43 does not make any undercut configuration during molding using a mold. Consequently, the main claw 43 can be molded without using any special molds.

(2-2) Second Locking Portion

The second locking portion 32 will be hereinafter described with reference to FIGS. 8 through 13. The second locking portion 32 is formed on the second cover body 31 (or one of the sites ($31_a$, $31_b$, $31_c$)). Although the second locking portion 32 does not have or demarcate any boundaries to the second cover body 31, it exists supposedly or imaginarily within a region shown with the chain double-dashed lines in FIGS. 8 through 13 for convenience of the descriptions.

Figure 9:
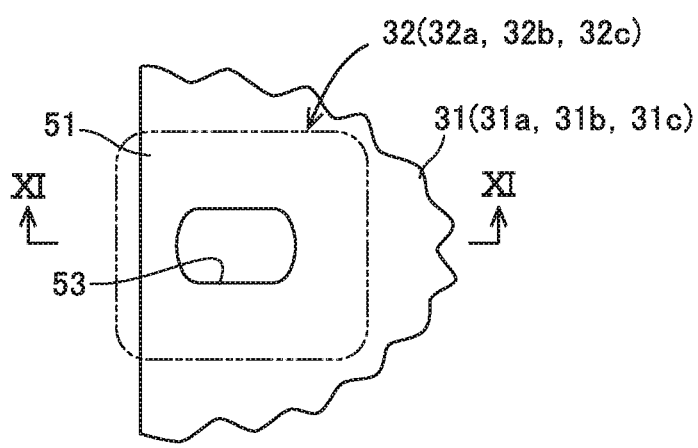
FIG. 9 is a diagram viewed in the direction of arrow IX shown in FIG. 8, namely, a plan view of the second locking portion.
Figure 10:
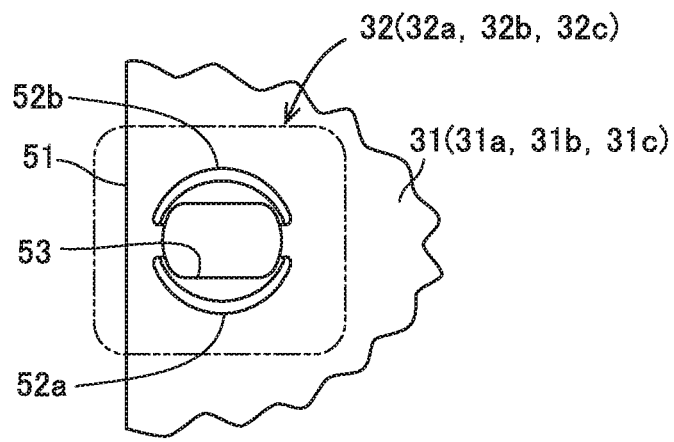
FIG. 10 is a diagram viewed in the direction of arrow X shown in FIG. 8, namely, a bottom view of the second locking portion.
Figure 11:
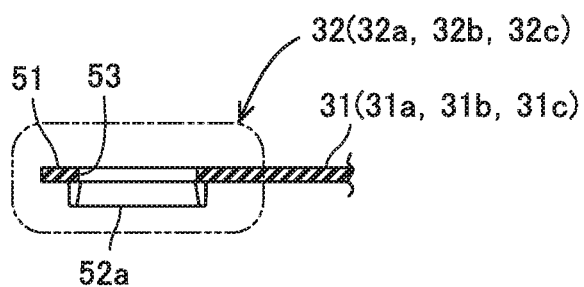
FIG. 11 is a cross-sectional view taken in the direction of arrows XI-XI shown in FIG. 9.

The second locking portion 32 comprises a base 51. However, the base 51 does not have or demarcate any boundaries to the second cover body 31, but shares some of the second cover body 31. As illustrated in FIGS. 9 and 10, the second locking portion 32 further comprises a main bore 53, which penetrates in a direction perpendicular to the direction of butting the first cover body 21 and second body 31 against one another, in the middle of the base 51. The main bore 53 is formed as an oblong configuration. The main bore 53 makes a site into which the main-tab body 42 is to be inserted. Therefore, the main bore 53 is formed to have a configuration that is larger than the contour of the main-tab body 42.

Moreover, the main bore 53 has a minor width that is smaller than the outside diameter of the main claw 43, but has a major width that is larger than the outside diameter of the main claw 43. In addition, the main bore 53 is formed so as to make the main claw 43 insertable when the main claw 43 is deformed elastically. However, the main bore 53 is formed so as to lock to the main claw 43 under such a condition that the main claw 43 is inserted into the main bore 53. That is, not only the main claw 43 comes to be insertable into the main bore 53 when the main claw 43 is deformed elastically, but also the main claw 43 is locked to the main bore 53 at the rim when the main claw 43 restores or returns elastically back to the original configuration.

Figure 8:
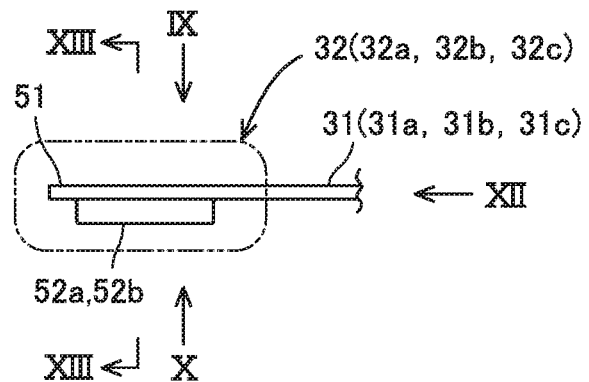
FIG. 8 is a front view of a second locking portion of a second divisional cover in the cover unit according to First Embodiment.
Figure 12:
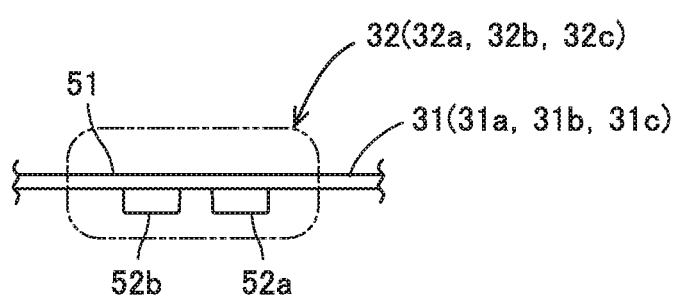
FIG. 12 is a diagram viewed in the direction of arrow XII shown in FIG. 8, namely, a right side view of the second locking portion.
Figure 13:
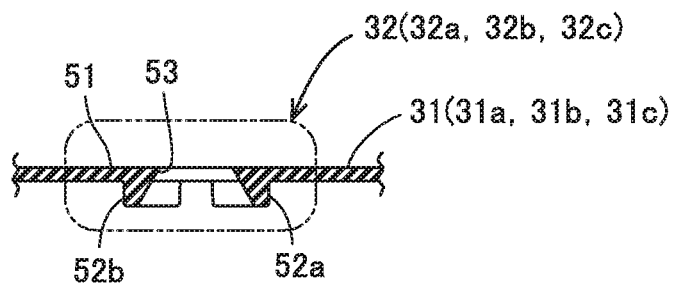
FIG. 13 is a cross-sectional view taken in the direction of arrows XIII-XIII shown in FIG. 8.
Figure 14:
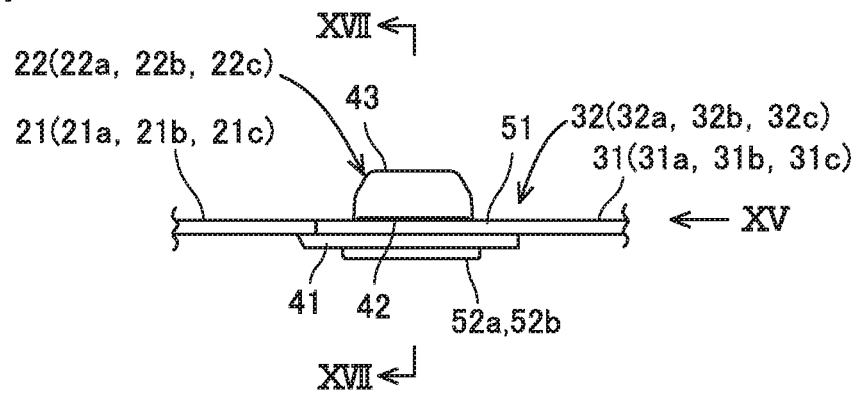
FIG. 14 is a front view illustrating a coupled state between the first locking portion and second locking portion in the cover unit according to First Embodiment.

As illustrated in FIGS. 8, 12 and 13, the second locking portion 32 further comprises sub-claws ($52_a$, $52_b$) that protrude respectively from the rim of the main bore 53 in the penetration direction of the main bore 53. That is, the sub-claws ($52_a$, $52_b$) protrude from the base 51 in a direction toward a side of the object 1, respectively. As illustrated in FIG. 10, each of the sub-claws ($52_a$, $52_b$) is formed along the longer side of the main bore 53 in the configuration of a circular arc. Moreover the sub-claws ($52_a$, $52_b$) are disposed so as to make the circularly-arced inner sides oppose one another.

Note herein that the sub-claw 52a is made to be capable of getting into the sub-recess 44a in the first locking portion 22 because it is formed as a configuration corresponding to the sub-recess 44a. Moreover, the sub-claw 52b is made to be capable of getting into the sub-recess 44b in the first locking portion 22 because it is formed as a configuration corresponding to the sub-recess 44b. That is, under such a condition that the sub-claws ($52_a$, $52_b$) get into the sub-recesses ($44_a$, $44_b$), the two pairs, namely, the sub-claws ($52_a$, $52_b$) and sub-recesses ($44_a$, $44_b$), lock to one another in the butting direction.

In addition, the sub-claws ($52_a$, $52_b$) has an arced inner-side face formed as a tapered shape that expands from the main bore 53 toward the leading-end side of the sub-claws ($52_a$, $52_b$), as shown in FIG. 13. As described above, the main bore 53 has a minor width that is smaller than the outside diameter of the main claw 43. On the other hand, the inner-side face of the sub-claws ($52_a$, $52_b$) is formed at the leading end to be larger than the outside diameter of the main claw 43. That is, the arced inner-side face of the sub-claws (52a, 52b) functions as a site that induces the main claw 43 to deform.

Moreover, the sub-claws ($52_a$, $52_b$) produce a clearance between the arced ends, as shown in FIG. 10. The main-tab body 42 of the first locking portion 22 is to be located in the clearance between the arced ends of the sub-claws ($52_a$, $52_b$). Therefore, the arced ends between the sub-claws ($52_a$, $52_b$) are formed to have a clearance distance to the same extent as a plate thickness that the main-tab body 42 has, or that is slightly larger than the plate thickness.

(2-3) Coupled State

How to couple the first locking portion 22 with the second locking portion 32 and how they are coupled to one another will be hereinafter described with reference to FIGS. 14 through 17. On an imaginary extension line extended from the leading end of the main claw 43 in the first locking portion 22, the main bore 53 in the second locking portion 32 is aligned positionally. Moreover, the sub-claws (52a, 52b) are put in a posture so that the clearance between the arced ends coincides with the main-tab body 42. That is, since a planar direction of the plate-shaped face of the main-tab body 42 coincides with the direction of butting the first cover body 21 and second cover body 31 against one another, the clearance is made so as to coincide with the butting direction.

Subsequently, the main claw 43 is fit into the main bore 53. On this occasion, the main claw 43 comes in contact with the sub-claws ($52_a$, $52_b$) on the arced inner-side faces, and then deforms elastically along the arced inner-side faces of the sub-claws ($52_a$, $52_b$). Thus, when the elastically deformed main claw 43 passes through the main bore 53 and thereafter restores or returns back to the original configuration elastically, the main claw 43 is locked to the main bore 53 at the rim in the penetration direction of the main bore 53 (i.e., in a direction perpendicular to the butting direction), as shown in FIGS. 14 through 17. That is, the main claw 43 inhibits the main-tab body 42 from coming off from the main bore 53.

Figure 15:
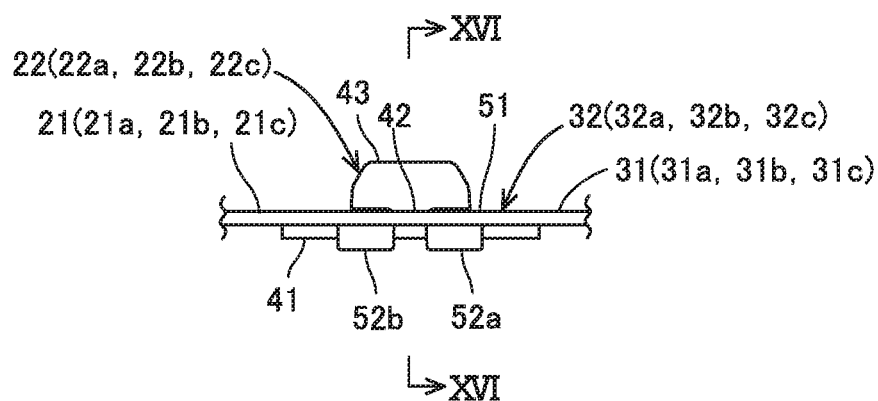
FIG. 15 is a diagram viewed in the direction of arrow XV-XV shown in FIG. 14.

In the course of fitting the main claw 43 into the main bore 53, some of the main-tab body 42 also passes through the main bore 53. As described above, the planar direction of the plate-shaped face in the main-tab body 42 coincides with the clearance between the arced ends of the sub-claws ($52_a$, $52_b$), as shown in FIG. 15. Therefore, the main-tab body 42 gets at the root site into the clearance between the arced ends of the sub-claws ($52_a$, $52_b$). Therefore, the main-tab body 42 locks to the sub-claws ($52_a$, $52_b$) in rotational directions around the central axis of the main-tab body 42. That is, the thus locked main-tab body 42 and sub-claws ($52_a$, $52_b$) inhibit the first locking portion 22 and second locking portion 32 from rotating around the central axis of the main-tab body 42.

Figure 17:
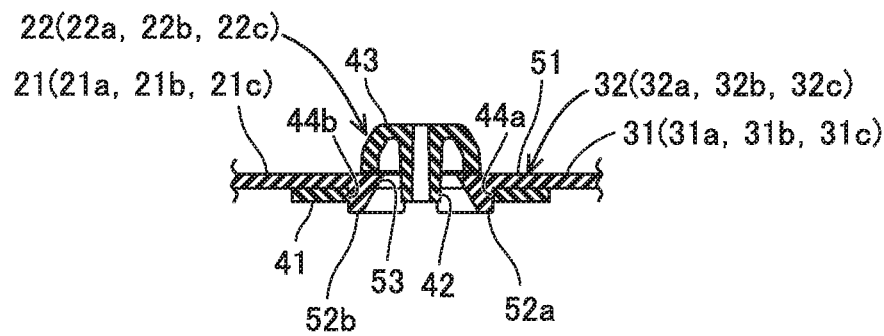
FIG. 17 is a cross-sectional view taken in the direction of arrows XVII-XVII shown in FIG. 14.

Moreover, in the course of fitting the main claw 43 into the main bore 53, the sub-claws ($52_a$, $52_b$) get into the sub-recesses ($44_a$, $44_b$) in the base tab 41, as shown in FIG. 17. Each of the sub-claws ($52_a$, $52_b$) has an arc-shaped contour; whereas the sub-recesses ($44_a$, $44_b$) are formed as a configuration corresponding to the arc-shaped contour of the sub-claws ($52_a$, $52_b$). Therefore, when the sub-claws ($52_a$, $52b$) get into the sub-recesses ($44_a$, $44_b$), the sub-claws ($52_a$, $52_b$) and sub-recesses ($44_a$, $44_b$) are inhibited from being displaced or aligned improperly each other in the butting direction.

Figure 16:
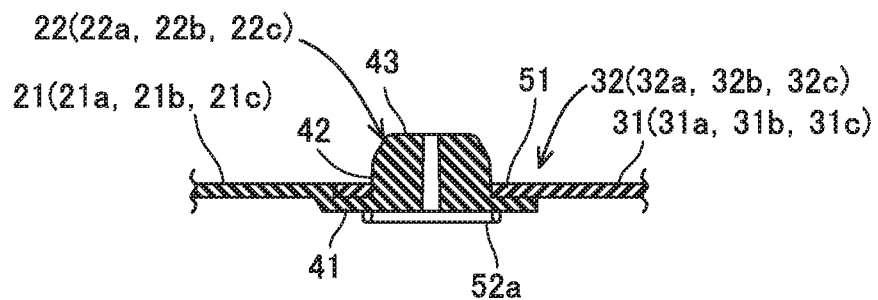
FIG. 16 is a cross-sectional view taken in the direction of arrows XVI-XVI shown in FIG. 15.

In addition, the main-tab body 42 is connected at the root site with the base tab 41 in the butting direction, as shown in FIG. 16. Accordingly, the main-tab body 42 is locked at the root site to the main bore 53 in the butting direction. Consequently, the main-tab body 42 is inhibited from being displaced or aligned improperly in the butting direction relative to the main bore 53.

Therefore, when the main claw 43 is inserted into the main bore 53, the main claw 43 is firmly inhibited from being displaced or aligned improperly in the butting direction relative to the main bore 53 by means of the following: the locking between the main-tab body 42 and the sub-claws ($52_a$, $52_b$) (i.e., a first auxiliary lock); the locking between the sub-claws ($52_a$, $52_b$) and the sub-recesses ($44_a$, $44_b$) (i.e., a second auxiliary lock); and the locking between the main-tab body 42 and the main bore 53 (i.e., a third auxiliary lock). Since the main claw 43 is made of an elastomer, it is likely to deform compared with when being made of a hard resin. However, when the main claw 43 is not displaced or aligned improperly relative to the main bore 53 in the butting direction, it is possible for the main claw 43 to maintain such a condition that it is locked securely to the rim of the main bore 53. Hence, even when external forces act on the first divisional cover 20 and second divisional cover 30 to separate them away from one another, it is possible to securely restrain the main claw 43 from coming off from the main bore 53.

Note herein that, among the first auxiliary lock, second auxiliary lock and third auxiliary lock which are described as above, it is also allowable to make any one of the three locks, or any two of them, function. If such is the case, making at least one of the three locks function leads to securely locking the main claw 43 to the main bore 53 at the rim, or vice versa. However, making two of the three locks, or three of them, function results in more securely locking the main claw 43 to the main bore 53 at the rim, or vice versa.

(3) Second Embodiment

Next, a first locking portion 122 and second locking portion 132 according to Second Embodiment will be hereinafter described with reference to FIGS. 18 through 30. Note herein that the right/left direction in FIGS. 18, 22 and 28 coincides with a direction of butting a first cover body 121 and second cover body 131 against one another at the butted sections. Moreover, the object 1 exists on the downside in FIGS. 18, 22 and 28. That is, in FIGS. 18, 22 and 28, the upside corresponds to an outer side of the object 1, and the downside corresponds to a central side of the object 1.

(3-1) First Locking Portion

The first locking portion 122 will be hereinafter described with reference to FIGS. 18 through 21. The first locking portion 122 comprises a prong-shaped main tab made so as to extend from an edge of the first cover body 121 in the direction of butting the first cover body 121 and second cover body 131 against one another. However, in order to make the first locking portion 122 a constituent element including the main tab only, the terms, the "first locking portion 122" and the "main tab," signify that they are an identical entity with one another. Note that it is not prevented that the first locking portion 121 can further comprise constituent elements other than the main tab.

Figure 18:
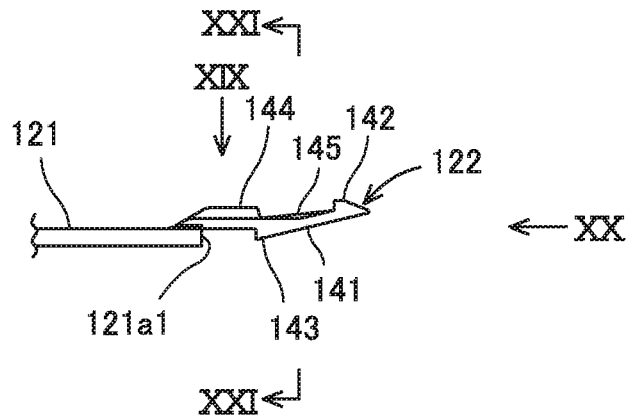
FIG. 18 is a front view of a first locking portion of a first divisional cover in a cover unit according to Second Embodiment.
Figure 19:
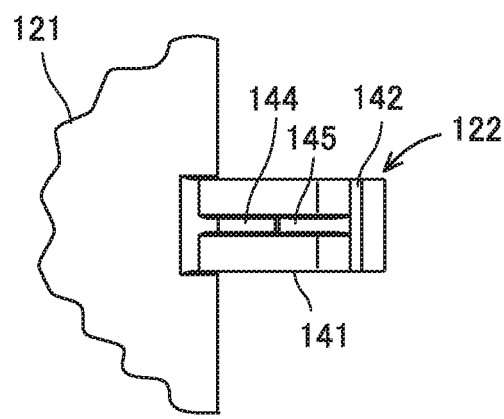
FIG. 19 is a diagram viewed in the direction of arrow XIX shown in FIG. 18, namely, a plan view of the first locking portion.
Figure 20:
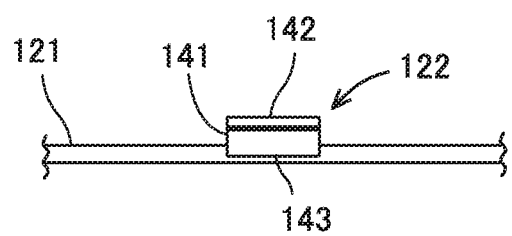
FIG. 20 is a diagram viewed in the direction of arrow XX shown in FIG. 18, namely, a right side view of the first locking portion.

As illustrated in FIG. 18, the first locking portion 122 serving as the main tab comprises a main-tab body 141, a main claw 142, a sub-claw 143, a deformation inhibitor protrusion 144, and a reinforcement ribbed member 145. The main-tab body 141, which is formed as a plate shape, has a contour formed in a rectangular shape, as shown in FIG. 19. Moreover, the main-tab body 141 is formed so as to extend from the edge of the first cover body 121 in the butting direction on the superficial side, as shown in FIG. 18. That is, the main-tab body 141 is not located on an identical plane with the edged part of the first cover body 121, so that it has a step or bump at the site at around an end face $121_{a1}$ of the edge in the first cover body 121. In detail, the main-tab body 141 is located to deviate or shift toward a side, which is opposite to the object 1, relative to the edged part of the first cover body 121.

The main claw 142, which is disposed on the main-tab body 141 at the leading end, protrudes to the side of a first face (i.e., an upper face shown in FIG. 18) in the main-tab body 141. The main claw 142 is formed at the leading-end edge of the main-tab body 141 over the entire length in the width direction, as shown in FIG. 19. Moreover, the main claw 142 is formed so as to make a protrusion magnitude greater as it comes or approaches more toward a counter-leading-end side (or a fixed-end side) of the main-tab body 141. That is, the main claw 142 is less likely to hook to its mating member in a direction heading toward the leading-end side of the main-tab body 141, but is likely to hook to its mating member in another direction heading toward the counter-leading-end side (or the fixed-end side) of the main-tab body 141.

The sub-claw 143, which is disposed on a more counter-leading-end side (or a fixed-end side) than is the main claw 142 in the main-tab body 141, protrudes to the side of a second face (i.e., a lower face shown in FIG. 18) in the main-tab body 141. The sub-claw 143 is formed over the entire length of the main-tab body 141 in the width direction. Moreover, the sub-claw 143 is formed so as to make a protrusion magnitude greater as it comes or approaches more toward a counter-leading-end side (or a fixed-end side) of the main-tab body 141. That is, the sub-claw 143 is less likely to hook to its mating member in a direction heading toward the leading-end side of the main-tab body 141, but is likely to hook to its mating member in another direction heading toward the counter-leading-end side (or the fixed-end side) of the main-tab body 141. Note herein that the sub-claw 143 opposes the end face 121a1 in the edge of the first cover body 121, as shown in FIG. 18.

The deformation inhibitor protrusion 144, which is disposed on a more counter-leading-end side (or a fixed-end side) than is the main claw 142 in the main-tab body 141, protrudes to the side of the first face (i.e., the upper face shown in FIG. 18) in the main-tab body 141. As illustrated in FIG. 19, the deformation inhibitor protrusion 144 is formed as a ribbed shape extending to the leading-end side of the main-tab body 141 at the middle in the width direction of the first face in the main-tab body 141. The deformation inhibitor protrusion 144 is formed so as to extend from a location, which corresponds to the sub-claw 143, toward the counter-leading-end side (or the fixed-end side) of the main-body tab 141 in the butting direction. That is, the deformation inhibitor protrusion 144 has a site, which overlaps or superimposes the sub-claw 143, on the leading-end side (or a free-end side) of the main-tab body 141. In more detail, the deformation inhibitor protrusion 144 has a site, which is formed in the shape of an inclined face, on the leading-end side (or the free-end side) of the main-tab body 141. When the deformation inhibitor protrusion 144 is viewed in the butting direction, it has a protruded face that is located at a slightly lower position than a position at which the main claw 142 is located, as shown in FIG. 18 (or as can be understood from FIG. 20). In other words, in a direction separating away from the object 1, the main claw 142 is located more off from the object 1 than is the protruded face of the deformation inhibitor protrusion 144 located.

Figure 21:
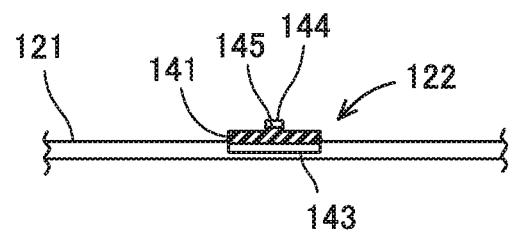
FIG. 21 is a cross-sectional view taken in the direction of arrows XXI-XXI shown in FIG. 18.
Figure 22:
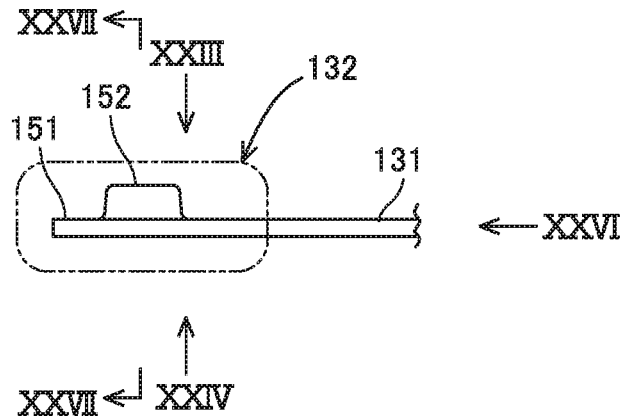
FIG. 22 is a front view of a second locking portion of a second divisional cover in the cover unit according to Second Embodiment.

In the first face (i.e., the upper face in FIG. 18) in the main-tab body 141, the reinforcement ribbed member 145 is disposed between the main claw 142 and the deformation inhibitor protrusion 144, as shown in FIGS. 18 and 19. The reinforcement ribbed member 145 is formed as a ribbed shape on an imaginary extension line extended from the deformation inhibitor protrusion 144. As illustrated in FIGS. 18 and 21, the reinforcement ribbed member 145 exhibits a protrusion magnitude that is small compared with that of the deformation inhibitor protrusion 144, and even compared with that of the main claw 142. Note herein that, since the first locking portion 122 is made of an elastomer, the first locking portion 122 is more likely to undergo elastic deformations markedly than when it is made of a hard resin. In particular, since the main-tab body 141 has a plate shape, it is likely to flex or bend. However, the reinforcement ribbed member 145 controls the elastic deformation magnitude of the main-tab body 141 to fall within a predetermined range while allowing the main-tab body 141 to undergo elastic deformation so as to flex or bend.

(3-2) Second Locking Portion

The second locking portion 132 will be hereinafter described with reference to FIGS. 22 through 27. The second locking portion 132 is formed on the second cover body 131. Although the second locking portion 132 does not have or demarcate any boundaries to the second cover body 131, it exists supposedly or imaginarily within a region shown with the chain double-dashed lines in FIGS. 22 through 27 for convenience of the descriptions.

Figure 27:
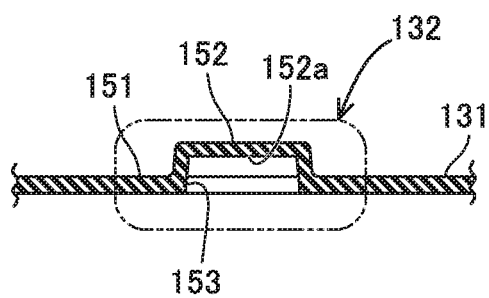
FIG. 27 is a cross-sectional diagram taken in the direction of arrows XXVII-XXVII shown in FIG. 22.

The second locking portion 132 comprises a base 151. However, the base 51 does not have or demarcate any boundaries to the second cover body 131, but shares some of the second cover body 131. The second locking portion 132 further comprises a main-bore formation member 152 at around the middle in the base 151. As illustrated in FIG. 27, the main-bore formation member 152 is formed as an inverted letter-"U" shape whose bottom face makes a flat-faced shape. Moreover, the main-bore formation member 152 is disposed on a first face (i.e., an upper face shown in FIG. 22) in the base 151. Note herein that the first face is present on the opposite side to the object 1. The main-bore format ion member 152 therefore includes on the first-face side a main bore $152_a$, which penetrates in the direction of butting the first cover body 121 and second cover body 131 against one another, as shown in FIGS. 24 and 25.

Figure 23:
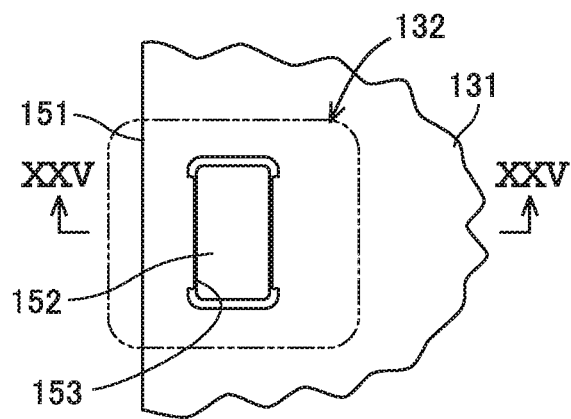
FIG. 23 is a diagram viewed in the direction of arrow XXIII shown in FIG. 22, namely, a plan view of the second locking portion.
Figure 24:
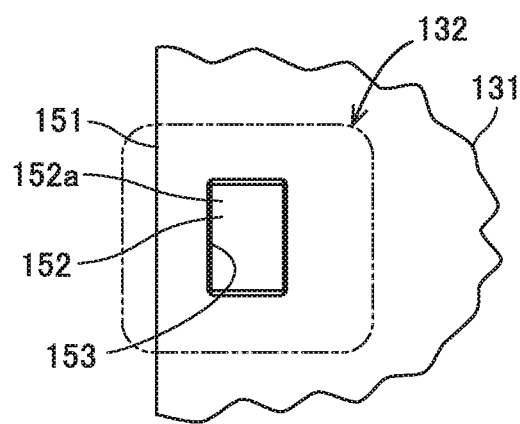
FIG. 24 is a diagram viewed in the direction of arrow XXIV shown in FIG. 22, namely, a bottom view of the second locking portion.

That is, the main bore $152_a$ has at the opposite ends an opened configuration formed in a rectangle that has longer sides extending in a planar direction of the base 151, as shown in FIGS. 23 and 24. The main bore $152_a$ has a width (i.e., the width in another planar direction of the base 151), and a height (i.e., the height in the normal direction to the planar faces of the base 151). Note that the width and height of the main bore $152_a$ correspond to those of the first locking portion 122. Thus, some of the main-tab body 141, and the main claw 142 are inserted into the main bore $152_a$ in the butting direction. Moreover, the main bore $152_a$ makes at the exit-side opening rim (i.e., one of the end faces of the main-bore formation member 152) a site to be locked by the main claw 142 that has been inserted into the main bore $152_a$.

Figure 25:
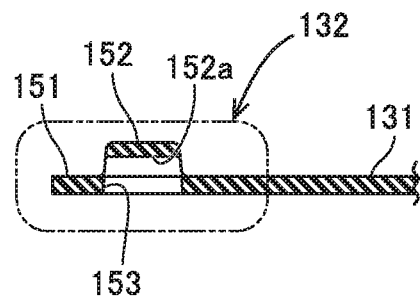
FIG. 25 is a cross-sectional diagram taken in the direction of arrows XXV-XXV shown in FIG. 23.
Figure 26:
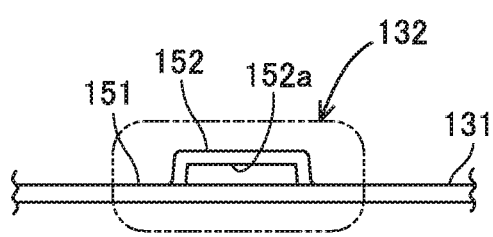
FIG. 26 is a diagram viewed in the direction of arrow XXVI shown in FIG. 22.

In addition, the second locking portion 132 further comprises a sub-recess 153, not only which opens toward the main bore $152_a$, but also which is to be locked to the sub-claw 143, as shown in FIGS. 24 and 25. The sub-recess 153 penetrates through the base 151 in the normal direction to the opposite faces of the base 151. As illustrated in FIGS. 25 and 27, the sub-recess 153 is formed at a location opposing the bottom face of the main-bore formation member 152 that is formed in an inverted letter-"U" shape. In more detail, the sub-recess 153 is formed as a rectangular shape, as shown in FIG. 24; and is formed longer than a length that the main-bore formation member 152 has in the butting direction, as shown in FIG. 25. Accordingly, the main-bore formation member 152 does not make any undercut configuration during molding using a mold. Consequently, the main-bore formation member 152 can be molded without using any special molds.

(3-3) Coupled State

Figure 28:
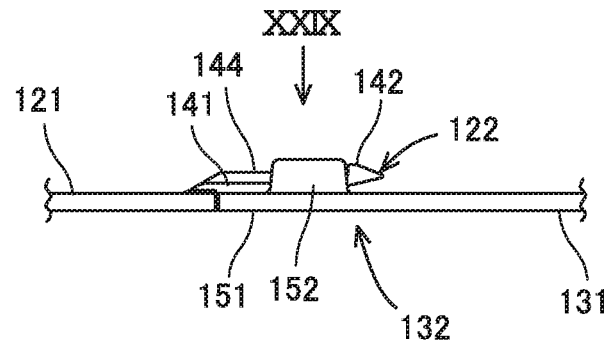
FIG. 28 is a front view illustrating a coupled state between the first locking port ion and the second locking portion in the cover unit according to Second Embodiment.
Figure 29:
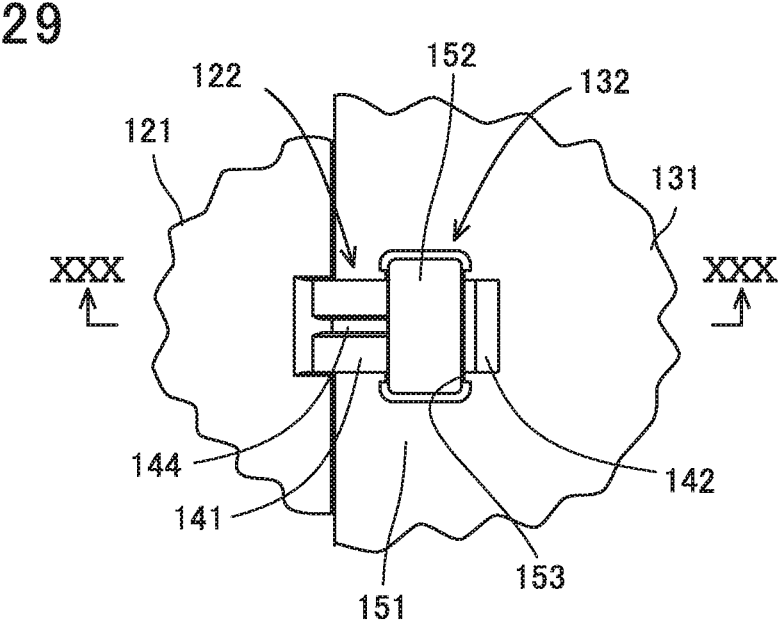
FIG. 29 is a diagram viewed in the direction of arrow XXIX shown in FIG. 28.

How to couple the first locking portion 122 with the second locking portion 132 and how they are coupled to one another will be hereinafter described with reference to FIGS. 28 through 30. On an imaginary extension line extended from the first locking portion 122 in the butting direction, the main bore $152_a$ in the second locking portion 132 is aligned positionally. Subsequently, the main claw 142 is fit into the main bore $152_a$. On this occasion, the main-tab body 141 deforms elastically. Under the circumstances, the reinforcement ribbed member 145 operates to move the main claw 142 in the main bore $152_a$ while making the main claw 142 come in contact with the main-bore formation member 152.

Figure 30:
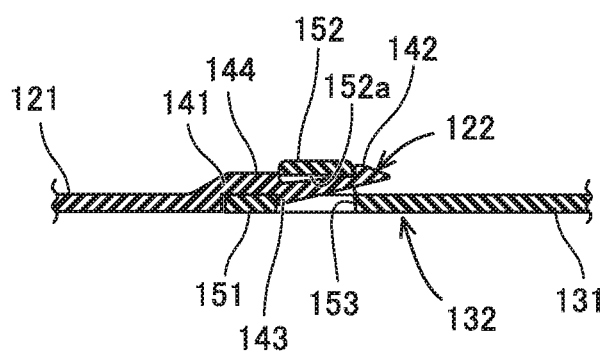
FIG. 30 is a cross-sectional diagram taken in the direction of arrows XXX-XXX shown in FIG. 29.

When the main claw 142 has passed through the main bore 152$_a$ so that the main-tab body 141 thereafter restores or returns back to the original configuration elastically, the main-tab body 141 undergone the elastic deformation locks the main claw 142 to the rim of the exit-side opening in the main bore 152$_a$, as shown in FIG. 30. That is, the main claw 142 inhibits the main-tab body 141 from coming off from the main bore 152$_a$.

At the timing when the main claw 142 protrudes from out of the exit-side opening in the main bore 152$_a$, the sub-claw 143 gets into the sub-recess 153 (shown in FIGS. 25 and 27) in the second locking portion 132. That is, under such a condition as the main claw 142 is locked to the rim of the exit-side opening in the main bore 152$_a$, the sub-claw 143 is locked to the sub-recess 153 in the butting direction, as shown in FIG. 30. In other words, the direction of locking the main claw 142 to the main bore 152$_a$, and the direction of locking the sub-claw 143 to the sub-recess 153 become identical with one another.

Moreover, when the sub-claw 143 (shown in FIG. 18) gets into the sub-recess 153, the deformation inhibitor protrusion 144 is pressed onto the end face of the entrance-side opening in the main-bore formation member 152, as shown in FIG. 30. Under the circumstances, the inclined face of the deformation inhibitor protrusion 144 undergoes compression deformation in the butting direction because it is pressed onto the end face of entrance-side opening in the main-bore formation member 152. Thereafter, when the sub-claw 143 gets into the sub-recess 153, the sub-claw 143 is accordingly put under the condition of being locked to the sub-recess 153. Consequently, some of the inclined face of the deformation inhibitor protrusion 144 gets into the interior of the main bore 152$_a$. As a result, the deformation inhibitor protrusion 144 is put under the condition of being in contact with the inner face of the main bore 152$_a$. At the same time, the second face (i.e., the lower face shown in FIG. 30) in the main-tab body 141 comes in contact with the base 151.

When the sub-claw 143 is thus locked to the sub-recess 153, as shown in FIG. 30, the deformation inhibitor protrusion 144 comes in contact with the inner face of the main bore 152$_a$ on the side of the entrance-side opening. Therefore, the deformation inhibitor protrusion 144 can inhibit the main-tab body 141, which is inserted into the main bore 152a, from deforming. As a result, the sub-claw 143 is kept being locked to the sub-recess 153. Moreover, because of the sub-claw 143 kept being locked to the sub-recess 153, the main claw 142 is kept being locked to the exit-side opening of the main bore 152$_a$ at the rim.

Since the first locking portion 122 is made of an elastomer, it is likely to deform compared with when it is made of a hard resin. However, in addition to the main claw 142 locked to the main bore 152$_a$ in the butting direction, the sub-claw 143 is further locked to the sub-recess 153 in the same direction. The first locking portion 122 and second locking portion 132 thus comprise dual locking structures in the butting direction. Therefore, the main claw 142 can maintain such a state that it is being securely locked to the main bore 152$_a$ at the rim. As a result, even when external forces act on the first divisional cover 20 and second divisional cover 30 in directions separating them away from one another, it is possible to securely restrain the main claw 142 from coming off from the main bore 152$_a$.

Having now fully described the present invention, it will be apparent to one of ordinary skill in the art that many changes and modifications can be made thereto without departing from the spirit or scope of the present disclosure as set forth herein including the appended claims.

What is claimed is:

1. A cover unit comprising:
a first divisional cover that covers a first part of an object partially; and
a second divisional cover that covers a second part of the object partially, and the second cover is coupled to the first cover;
the first divisional cover including:
a first cover body; and
a first lock portion made of an elastomer, and formed integrally with the first cover body, the first lock portion having a base tab extending from an edge of the first cover body in a plane parallel to the edge of the first cover body, and a prong-shaped main tab extending from the base tab;
the second divisional cover including:
a second cover body; and
a second lock portion made of an elastomer, formed integrally with the second cover body, the second lock portion having a base at an edge of the second cover body defining a main bore into which the main tab is insertable;
the main tab further includes a main claw disposed on a leading-end side thereof, and locked to the main bore to inhibit the main tab from coming off from the main bore;
wherein, when the main tab is received into the main bore, the base of the second lock portion rests against the base tab of the first lock portion, so that the edge of the first cover body is coplanar with the edge of the second cover body.

2. The cover unit according to claim 1, wherein:
one of the first lock portion and the second lock portion further has a sub-claw;
the other one of the first lock portion and the second lock portion further has a sub-recess that is locked to the sub-claw under a condition that the main tab is inserted into the main bore, and that is locked to the sub-claw to maintain the main claw under a condition of being locked to the main bore.

3. The cover unit according to claim 2, wherein:
the main bore penetrates in a direction perpendicular to a butting direction at a butting section between the edge of the first cover body and the edge of the second cover body, the butting direction being a direction in which the edge of the first cover body and the edge of the second cover body abut one another;
the main claw locks to the main bore in the direction perpendicular to the butting direction; and
the sub-claw locks to the sub-recess in the butting direction.

4. The cover unit according to claim 3, wherein:
the first lock portion has:
the base tab connected with the first cover body;
a main-tab body connected with the base tab, inserted into the main bore, and serving as a part of the main tab;
the main claw disposed at a leading end of the main-tab body, and serving as a part of the main tab; and
the sub-recess is disposed between a root site of the main-tab body and the base tab, and penetrates in the direction perpendicular to the butting direction; and
the second lock portion has:
the sub-claw that protrudes from a rim of the main bore in a penetration direction of the main bore, and locks to the sub-recess in the butting direction under a condition that the sub-claw gets into the sub-recess.

5. The cover unit according to claim 4, wherein:
the main-tab body is formed as a configuration corresponding to a configuration which a mushroom has at a stipe part thereof; and
the main claw is formed as a configuration corresponding to another configuration which the mushroom has at a pileus part thereof.

6. The cover unit according to claim 4, wherein:
the root site of the main-tab body is connected with the base tab in the butting direction; and
the sub-recess is disposed between the root site of the main-tab body and the base tab relative to the root site of the main-tab body in the direction perpendicular to the butting direction.

7. The cover unit according to claim 6, wherein:
the root site of the main-tab body is connected on opposite sides thereof with the base tab in the butting direction; and
the sub-recess is disposed between the root site of the main-tab body and the base tab relative to the root site of the main-tab body on opposite sides of the main-tab body in the direction perpendicular to the butting direction.

8. The cover unit according to claim 2, wherein:
the main bore penetrates at a butting section between the first cover body and the second cover body in a butting direction;
the main claw locks to the main bore in the butting direction; and
the sub-claw locks to the sub-recess in the butting direction.

9. The cover unit according to claim 8, wherein:
the main tab is provided with:
a main-tab body formed as a plate shape;
the main claw disposed at a leading end of the main-tab body, and that protrudes to a first-face side of the main-tab body; and
the sub-claw disposed in the main-tab body on a more counter-leading-end side than is the main claw, and that protrudes to a second-face side of the main-tab body; and
the second lock portion further has:
the main bore into which the main-tab body is inserted, and which is locked to the main claw; and
the sub-recess opens not only opening toward the main bore, and is locked to the sub-claw.

10. The cover unit according to claim 9, wherein the main tab is further provided with:
a deformation inhibitor protrusion disposed in the main-tab body on a more counter-leading-end side than is the main claw, that protrudes to the first-face side of the main-tab body, and that comes in contact with an inner face of the main bore, under such a condition that the sub-claw is locked to the sub-recess, to inhibit the main-tab body, which is put under the condition of being inserted into the main bore, from deforming.

11. The cover unit according to claim 10, wherein the deformation inhibitor protrusion is disposed so as to extend from a location, which corresponds to the sub-claw, toward a counter-leading-end side of the main-tab body in a bulging direction, and comes in contact with an opening-side inner face in the main bore on a counter-leading-end side of the main-tab body.

12. The cover unit according to claim 1, wherein:
the first cover body and the first lock portion are formed of an elastomer integrally; and
the second cover body and the second lock portion are formed of another elastomer integrally.

13. A cover unit comprising:
a first divisional cover covering some of an object partially; and
a second divisional cover not only covering another some of the object partially, but also coupled to the first cover;
the first divisional cover including:
a first cover body; and
a first locking portion made of an elastomer, and formed integrally with the first cover body;
the second divisional cover including:
a second cover body; and
a second locking portion made of an elastomer, formed integrally with the second cover body, and locking to the first locking portion to couple the first divisional cover to the second divisional cover;
the first locking portion having a prong-shaped main tab;
the second locking portion having a main bore into which the main tab is insertable;
the main tab provided with a main claw disposed on a leading-end side thereof, and locked to the main bore to inhibit the main tab from coming off from the main bore;
the second locking portion further has a sub-claw;
the first locking portion further has a sub-recess not only locked to the sub-claw under such a condition that the main tab is inserted into the main bore, but also locked to the sub-claw to maintain the main claw under a condition of being locked to the main bore;
the main bore penetrates in a direction perpendicular to a butting direction at a butting section between an edge of the first cover body and an edge of the second cover body, the butting direction being a direction in which the edge of the first cover body and the edge of the second cover body abut one another;
the main claw locks to the main bore in the direction perpendicular to the butting direction;
the sub-claw locks to the sub-recess in the butting direction;
the first locking portion has:
a base tab connected with the first cover body;
a main-tab body connected with the base tab, inserted into the main bore, and serving as some of the main tab;
the main claw disposed at a leading end of the main-tab body, and serving as some of the main tab; and
the sub-recess not only formed between a root site of the main-tab body and the base tab, but also penetrating in the direction perpendicular to the butting direction; and
the second locking portion has:
the sub-claw not only protruding from a rim of the main bore in a penetration direction of the main bore, but also locking to the sub-recess in the butting direction under such a condition that the sub-claw gets into the sub-recess.

* * * * *